Patented Nov. 28, 1939

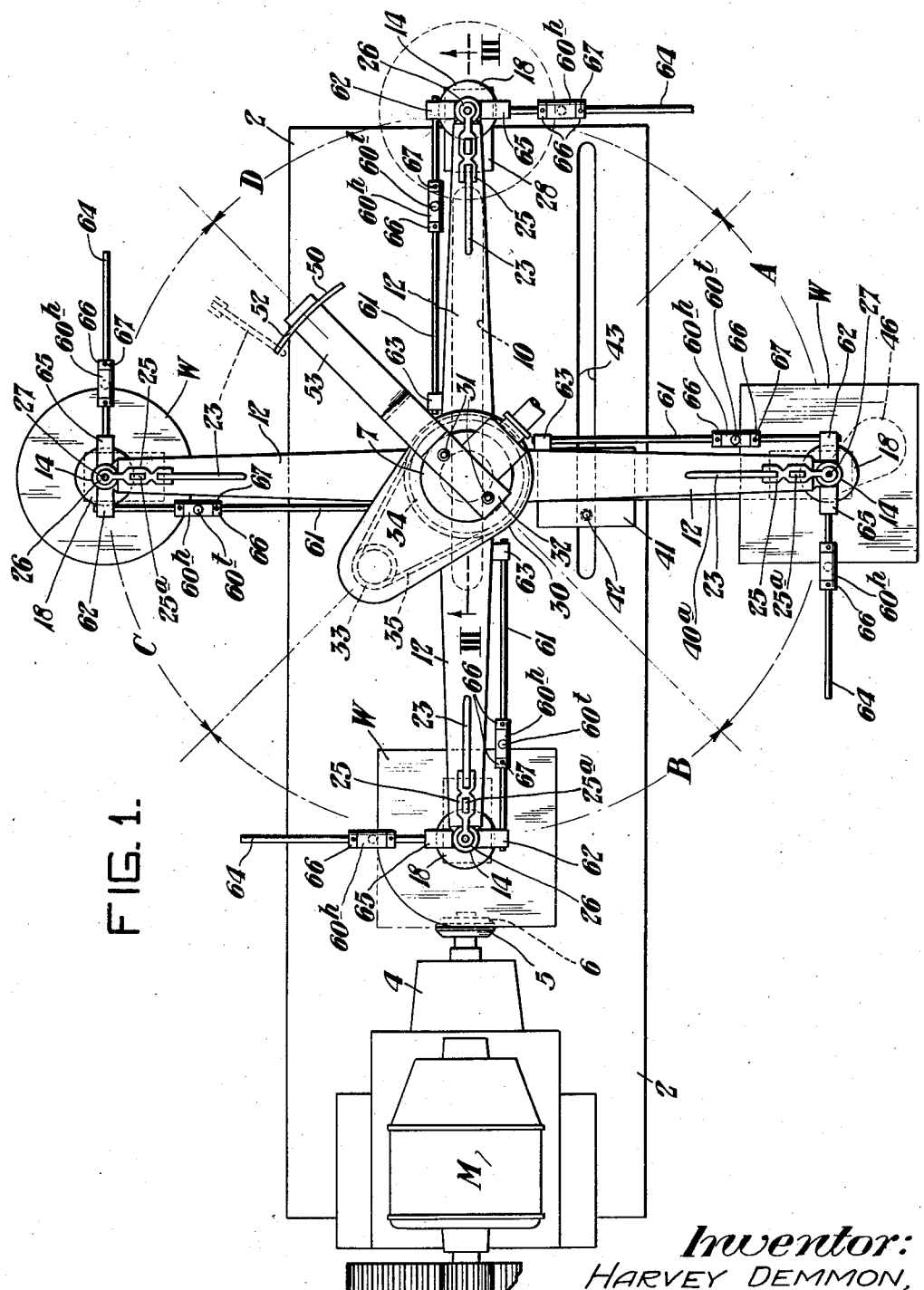

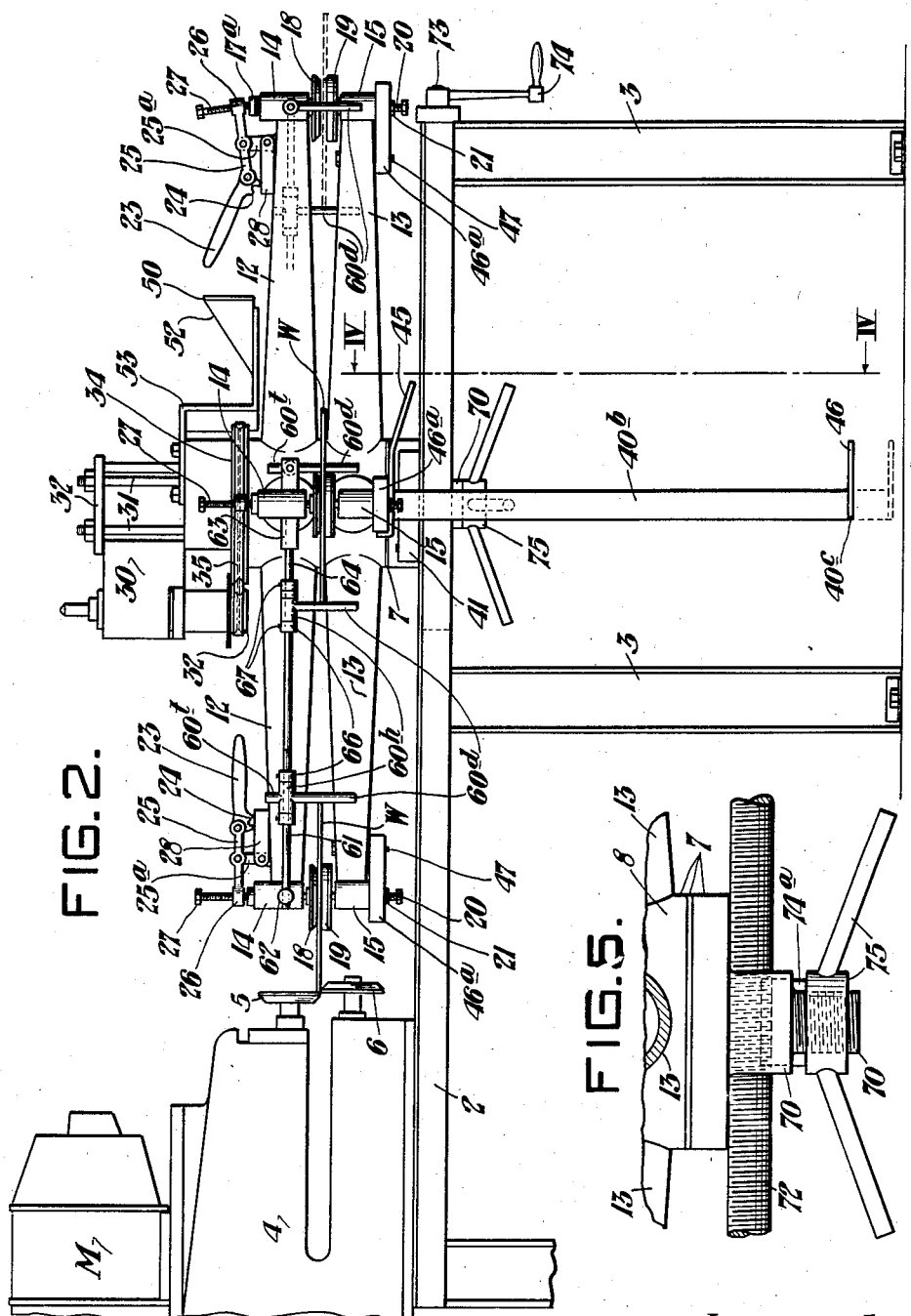

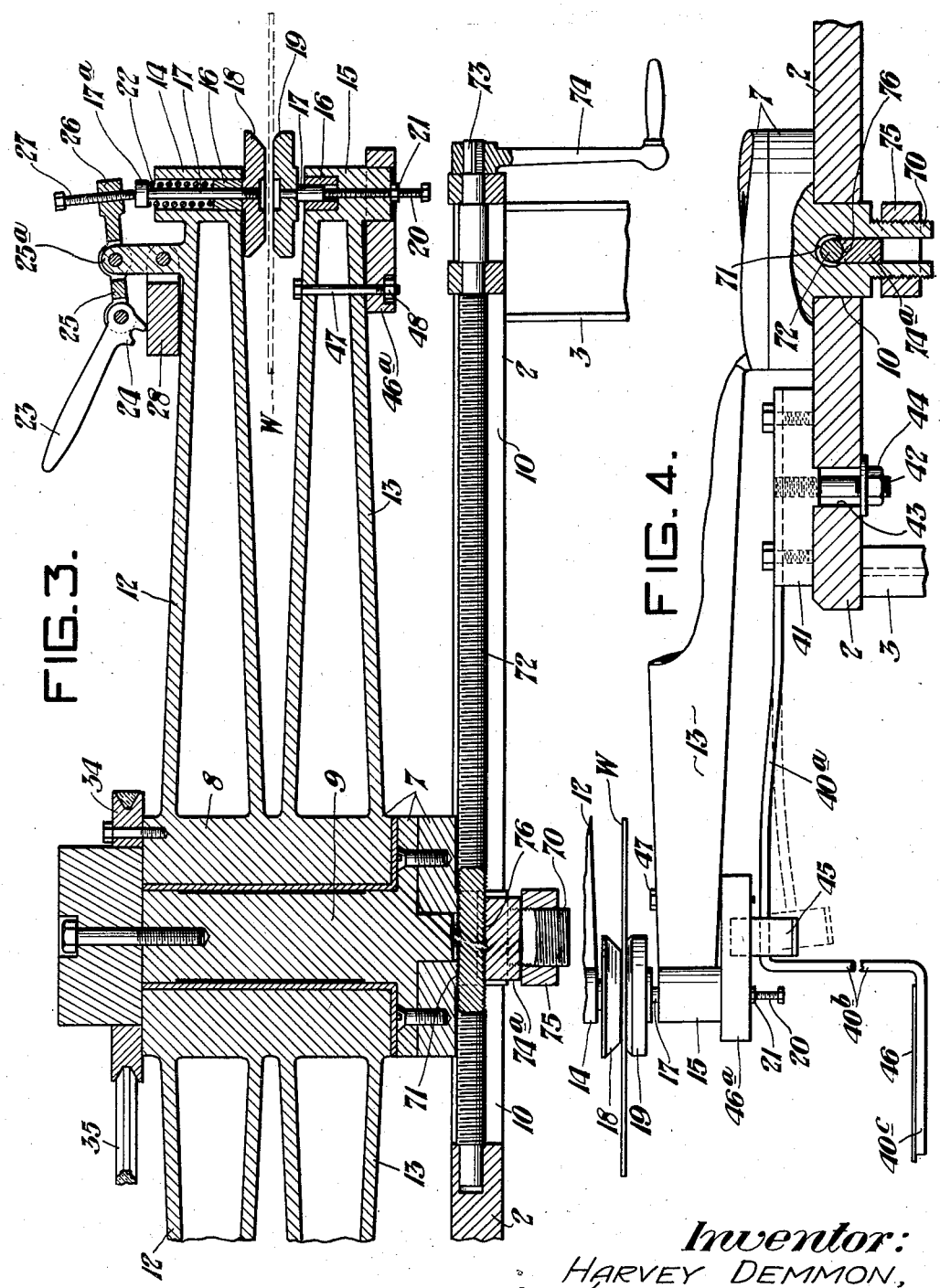

2,181,315

UNITED STATES PATENT OFFICE 2,181,315

APPARATUS FOR CIRCLE SHEARING

Harvey Demmon, Sharon, Pa.

Application August 2, 1937, Serial No. 157,055

1 Claim. (Cl. 164—63)

My invention relates to an apparatus for performing circle shearing operations upon sheet-like metal materials.

Heretofore, circular products have been formed by either die stamping or circle shearing. Each of these has a limited field of economical use and each has definite operating disadvantages.

By the die stamping method, it is possible to produce circular products on a quantity basis. The application of this method is, however, necessarily limited to quantity production manufacturing, since new dies are required for each change in the desired diameter of the product. Often the number of pieces required is so small that the cost of making a new die of the particular size needed is entirely disproportionate to the price to be obtained for the product. Moreover, circular pieces produced by die stamping methods usually require a subsequent operation which is necessary to flatten the deformed edge and to remove the burr formed by the die stamp machine. Positive safety hazards have not been entirely eliminated from die press operation.

In the various circle shears heretofore available, the necessary operations, with the exception of the cutting action itself, have been entirely manual. Positioning of the work-piece, guiding of the piece in between the cutting knives, removing the product and removing the scrap are discontinuous operations which do not readily lend themselves to rapid production. These operations, moreover, are inherently attended by serious personal injury hazards.

One of the objects of this invention is to circle shear disks from sheets in a manner relatively safe for the worker.

Another object is to economically produce circular products, of any desired diameter, without the necessity of making costly changes in the producing equipment for each desired diameter of product.

These and other objects will become apparent when considered in conjunction with the following description and the accompanying drawings, in which:

Figure 1 is a plan.

Figure 2 is a side elevation.

Figure 3 is a section from the line III—III in Figure 1.

Figure 4 is a partial section from the line IV—IV in Figure 2.

Figure 5 is a detail.

Referring to the drawings in detail, a table top 2 is positioned at a convenient operating height above the floor by the legs 3. At one end this table top mounts a circle shear 4 of conventional design. The circle shear has vertical, rotary knives 5 and 6, at least one of which is driven through suitable gearing by a motor M.

The table top 2 is provided with a slot 10 located parallel the axis of rotation of the shear knives 5 and 6 and extending through the greater portion of the table length. This slot provides a slidable mounting arrangement for a turret head 7. This turret head comprises essentially an outer shell or turret 8 which is rotatably mounted on a central upright stationary post assembly 9. Fixedly attached to the rotatable turret 8 and radially extending outwardly therefrom are a plurality of arm sets, each of which comprises upper arms 12 and lower arms 13. At their outer ends, each of the arms 12 and 13 terminates in vertical hollow cylindrical portions 14 and 15. Each cylinder contains a bearing 16 to facilitate the free rotation of vertical shafts 17 on the inner ends of each of which are mounted upper and lower turntable work lamps or disks 18 and 19, respectively. The lower work clamping disk 19 is maintained in any desired vertical spaced relation respecting the upper work clamping disk 18, by means of a screw 20 attached to the shaft 17 and which may be fixedly secured in any given position by a lock nut 21. The screw and lock nut provide a means of adapting the clamp disks 18 and 19 to sheet materials having different thicknesses, or to a varied number of piled sheets. The upper clamp disk 18 is maintained in a normally unclamped position by means of a helical spring 22, the lower end of which seats upon the top surface of the bearing 16 and the upper end of which exerts an upward thrust against a cap 17a provided on the upper end of the shaft 17, which it contacts. The clamping pressure required to be exerted by the disks 18 and 19 on the work-piece W is developed by the clamping handle 23. This clamping handle is provided at its inner end with an integral eccentric portion 24 fulcrumed in a forked rocker arm 25 fulcrumed in an upright member 25a fixedly attached to the upper surface of the arm 12. At the end opposite its point of attachment with the clamping handle 23, the link 25 terminates in an enlarged portion 26 which is internally threaded to receive an adjustment screw 27. This screw provides a means by which the clamping pressure exerted on the work-piece W may be adapted to the various different operating conditions encountered, and to assure free rotation of the shafts 17. A member 28 provides a bearing face on which the eccentric 24 of the clamp handle 23 bears.

Fixedly mounted on top of the stationary turret assembly 9 is a compressed air motor 30. The mounting for this motor comprises bolts 31 and a clamping bar 32 by which the housing of the air motor may be fixed to the stationary turret. This motor has a drive pulley 33 mounted on the lower end of its shaft, which is in horizontal alignment with a similar pulley 34 mounted on the upper end of the rotatable turret 8. An endless belt 35 is provided to drive the turret pulley 34 by the motor pulley 33. The speed of rotation of the turret head is adjusted by means of a conventional air reduction valve (not shown) installed in the air supply line.

The rotation of the turret head 7 is arrested by a latch arrangement located in spaced relation to the location of the cutting knives 5 and 6, comprising a spring steel member 40$^a$ bolted on a block 41 slideably mounted on the table top 3 by a bolt 42 depending downwardly through a slot 43 in the table top and provided with a nut 44. The member 40$^a$ extends horizontally outward beyond the side edge of the table 3 to a point which is directly beneath the path of travel of the outer end of the arms 13. At this point the member has fixedly attached thereto a trip latch 45. Immediately beyond this trip latch the member 40$^a$ is bent downwardly in a length 40$^b$ which terminates in a bent horizontally extending length 40$^c$. A treadle 46 is provided on the length 40$^c$ as a means for operating the trip latch 45. At the outer ends of the lower arms 13 on their under surfaces are latch engaging blocks 46$^a$. In each instance the block is detachably mounted on the arm 13 by a bolt 47 and nut 48, and is restrained from motion about this bolt by reason of its encompassing the lower portion of the cylinder 15. Thus, by the inclination of the frontmost portion of the latch 45 there is a latching effect with respect to the latch block 46$^a$, and a subsequent arresting of the arm to which it is attached when, by rotation of the latter, the latch block 46$^a$ is brought into engagement with the latch 45.

In spaced relation to the position occupied by the above described latching arrangement, there is a clamp release 50 comprising an arcuate vertical rigid member having an inclined upper or cam surface 52. This member is mounted on the outer end of a bracket 53 fixedly attached to the top of the stationary turret post 9. The radial and the vertical location of this clamp release 50 is such as will bring the clamp lever 23 into releasing engagement with the surface 52 when the lever is rotated directly above the top or cam surface portion of the release 50.

To facilitate proper positioning of the work-piece W with respect to the work-holding disks 18 and 19, each such pair of disks has associated with it two stops 60, spaced at right angles from each other so as to be effective with respect to at least two adjacent sides of the work-piece W to center the same with respect to the clamping means. The stops 60 comprise a horizontal tubular portion 60$^h$, a heavy dependent cylindrical portion 60$^d$ and, in some instances, a lighter upright portion 60$^t$. These stops are mounted by way of their portions 60$^h$ for one dimension of the work-piece W, on the rods 61, which are parallel to, and attached to, the upper arm 12 at the inner and outer ends thereof by suitable supports 62 and 63 respectively, it being these stops that have the portions 60$^t$, while for the other dimension of the work-piece W the stops are mounted on rods 64 which are fixed at their inner ends only in supports 65 similar to those supports provided for the rods 61. The stops 60 are adjustably mounted on the rods 61 and 64 by collars 66 which are maintained in position at the desired points by setscrews 67. The collars bear against the portions 60$^h$ of the stops only to a degree which will permit some degree of rotation of the latter about their supporting rods when a force is applied to the dependent portion of the stop rods in sufficient amount to overcome the greater weight of this portion. These stops which are mounted upon the supporting rods 61 and which are provided with upright portions 60$^t$, after partial rotation of the stops come into contact with the upper arm member 12 by way of the portions 60$^t$ and are thus held against these stop rods.

The stationary post turret assembly 9 terminates, at its lower end, in a transverse forked portion 70 which depends downwardly through the slot 10 in the table 2 and is provided with internal threading 71. Longitudinally disposed in the slot 10 is a lead screw 72, the threads of which engage the threading 71 of the forked portion 70. At its outer end the lead screw 72 terminates in a head 73 adapted for rotation by means of a crank 74. Thus the turret 7, carrying the work-holding disks 18 and 19 on which the work-piece W is centered, may be moved various distances toward or away from the knives 5 and 6 by rotation of this lead screw 72. When the work-holding disks have been moved to a proper position with respect to the cutting knives, the turret is locked in this position by means of a block 74$^a$ and wing nut 75. This block 74$^a$ slides in the vertically forked portion 70 of the turret assembly 9 and is provided on its upper surface with a continuation of the threading 76 engaging the threads of the lead screw 72. The wing nut 75 engages external threads 78 on the forked portion 70 and bears against the under side of this block 74$^a$ so as to force it into clamping engagement with the lead screw and thus positively maintain the set spaced relation between the work-holding disks and the cutting knives.

The operation of the apparatus may be most clearly presented by logically dividing a cycle of operations into sectors comprising: A, loading of the work-piece; B, cutting a circle from the work-piece; C, release of sheared product; and D, removal of the product. With respect to each other, these operations are successive in the order named, while with respect to time, they occur substantially simultaneously.

On receipt of a particular production card order, the circle shear operator determines whether the work-piece sheet may be sheared in single, two, three or more thicknesses and accordingly adjusts and sets the vertical position of the lower clamping disk 19 by means of the screw 20 and lock nut 21. The turret 7 is then moved along the slot 10 by turning the handle 74, thus rotating the lead screw which carries the turret. Taking his position at the location indicated in Figure 1, the operator places the set-up work-piece W between the clamping disks 18 and 19, centers it, sets the stop rods 60 by means of the collars 66 and setscrews 67 and clamps the work-piece W by moving the lever 23 downwardly against the compression of the spring 22 until the eccentric of the lever bears upon the block 28 slightly beyond the angle of maximum throw of this eccentric. The motor M is switched on, and the compressed air supply valve for the air motor 30 is opened, the treadle 46 is then depressed, thereby disengaging the latch piece 45 from beneath the latch block 46, and the work-piece is rotated from sector A toward the knives 5 and 6 in sector B by means of the motor acting through the belt drive 35, the rotatable turret 8 and the arm members 12 and 13. In this first cutting operation the speed of rotation of the arm members is adjusted by the air reduction valve so that the work-piece W moves into engagement with the cutting knives at the same speed as the latter, in order to avoid tearing of the work-piece due to a pull developed by the knives when traveling at a higher speed than the work-piece and to avoid crimping of the work-piece due to the inability of the knives, when traveling at a speed slower than that of the work-piece, to assimilate the forward urging force exerted by the rotating turret.

By the spaced relationship between the knives 5 and 6 and the latching arrangement 40—48 inclusive, simultaneously with the engaging of the work-piece W by the cutting knives, the following pair of arm members 12 and 13 have rotated into a position such that the latch block 46, carried by the lower arm member 13, is engaging with the latch-piece 45. The rotation of the arm members is thereby arrested and the drive belt 35, uninterruptedly driven by the air motor 30, slips on the driven pulley 34 of the turret head 8, functioning in the manner of a slip clutch during the time the latching is maintained. When the work-piece is engaged by the cutting knives, the progressively advancing gripping or feeding action exerted by the rotating knives on the workpiece effects rotation of the latter, together with its pair of work holding disks 18 and 19 and their shafts 17 within the bearings 16, until the extra circular portion of the work-piece has been removed by the cutting action. During the rotation of the work-piece as described above, the stop parts 60$^d$, although restrained from any outward movement along the support rods 61 and 64 by the collars 67, are free to swing about these support rods, tangentially to the outline of the circular cut. Thus, the stops are effective to center the work-piece without restraining its rotation under action of the cutting knives.

At the completion of the second operation, performed in sector B, cutting of the circle, the first operation, performed in sector A (namely, loading of the following pair of work-holding disks) has been completed. The operator accordingly again depresses the treadle 46, unlatching the loaded arm, and the action of the drive belt 35 being therefore unopposed revolves this second work-piece into engagement with the cutting knives. The second cutting operation takes place, the first circle product having been rotated to sector C and the scrap having been shunted off the table top by this rotation.

After the loading of the second following pair of work holding disks, in sector A, and during its rotation into sector B, the first completed circle product is rotated from sector C toward sector D. At a certain point in this rotation, the clamping lever 23 on the arm 12 comes into engagement with the inclined or cam surface 52 of the member 50. On further rotation of the arm 12 the free end of the lever 23 is moved upward, about the fulcrum provided by the link member 25. The throw of the eccentric at the inner end of the lever is decreased and the spring 22, which was compressed in the sector A when the work-piece was clamped between the work holding disks by manual downward movement of the lever arm 23, thereby released, thus unclamping the circle product so that on its arrival in sector D the product may be freely removed, either manually or by automatic means, such as a suitable operating arm provided with suction cups.

It will be noted in Figure 1 that the outer ends of the stop rod support arms 64 have a path of travel which, for the circle radius shown, approaches the cutting knives 5 and 6. Obviously, if the turret head were moved closer to the cutting knives in order to produce a circle product of appreciably smaller radius, the arms 64, while being rotated through sector B, would strike the upper knife 5. To prevent the occurrence of this result several support arms are provided for each arm, each having a different length for a range of circle radii.

I claim:

Apparatus for circle shearing metal sheets, comprising a table having a top, a powered circle shear at one end of said top and providing vertical, rotary knives, said top having a slot located parallel the axis of rotation of said knives and extending the greater portion of its length, a vertical post riding in said slot and rotatively mounting a turrent, a plurality of arm sets radially extending from said turret and each comprising parallel, upper and lower arms having aligned vertical bearings, vertical shafts rotatively mounted by said bearings and turntable sheet clamps mounted on the mutually opposed ends of said shafts, adjustable means for vertically restraining the lower ones of said shafts, spring means for upwardly urging the upper ones of said shafts and releasable clamp means for forcing and holding downwardly said upper ones of said shafts, whereby sheets may be horizontally retained between said turntable sheet clamps, means for continuously urging said turret to rotate, a releasable latch for restraining rotation of said turret and holding said turret at positions where said arms are aligned with the axis of rotation of said knives, whereby successive releasals of said latch successively bring successive sets of said arms into alignment with the axis of rotation of said knives, means spaced from said knives in the rotating direction of said turret for engaging and releasing said releasable clamp means, the latter being carried by said arms, a set of sheet positioning stops carried by each set of said arms and each comprising a plurality of depending, swinging legs spaced to engage the sheet edges and center the sheets respecting the axis of rotation of said turnable sheet clamps, said legs swinging to allow rotation of the sheets during circle shearing operations, and a screw extending parallel said slot in said table top in which said vertical post rides and which is in screw threaded engagement with said post, whereby rotation of said screw adjusts the position of said post relative to said knives of said circle shear.

HARVEY DEMMON.